United States Patent
Tanaka et al.

(10) Patent No.: US 8,243,605 B2
(45) Date of Patent: Aug. 14, 2012

(54) NETWORK DEVICE VERIFYING APPARATUS

(75) Inventors: Kimie Tanaka, Kyoto (JP); Satoshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 605 days.

(21) Appl. No.: 12/096,676

(22) PCT Filed: Dec. 15, 2006

(86) PCT No.: PCT/JP2006/325086
§ 371 (c)(1),
(2), (4) Date: Jun. 9, 2008

(87) PCT Pub. No.: WO2007/069737
PCT Pub. Date: Jun. 21, 2007

(65) Prior Publication Data
US 2009/0135725 A1 May 28, 2009

(30) Foreign Application Priority Data
Dec. 15, 2005 (JP) .................................. 2005-361567

(51) Int. Cl.
*G01R 31/08* (2006.01)
*G06F 11/00* (2006.01)
*G08C 15/00* (2006.01)
(52) U.S. Cl. ....................................................... 370/241
(58) Field of Classification Search .................... 370/241
See application file for complete search history.

(56) References Cited

U.S. PATENT DOCUMENTS

| | | | |
|---|---|---|---|
| 5,953,372 A | 9/1999 | Virzi | |
| 6,385,236 B1 | 5/2002 | Chen | |
| 6,839,055 B1* | 1/2005 | Nguyen | 345/204 |
| 6,940,263 B2 | 9/2005 | Henriksson | |
| 2004/0218540 A1* | 11/2004 | Foschiano et al. | 370/241 |
| 2007/0064941 A1* | 3/2007 | Unger et al. | 380/210 |

FOREIGN PATENT DOCUMENTS

| | | |
|---|---|---|
| JP | 5-102891 | 4/1993 |
| JP | 2002-344448 | 11/2002 |

* cited by examiner

*Primary Examiner* — Anh-Vu Ly
*Assistant Examiner* — Maharishi Khirodhar
(74) *Attorney, Agent, or Firm* — McDermott Will & Emery LLP (57) ABSTRACT

In a reception verifying mode, a data transmitting section (106S) transmits prescribed data through a transmission interface (101S), and a controller (102) exchanges prescribed information and verifies an operation status of a device (21) to be verified through the transmission interface. In a transmission verifying mode, a data receiving section (106R) receives prescribed data through a reception interface (101R), and the controller exchanges prescribed information and verifies an operation status of a device to be verified through a reception interface. In a transmission/reception verifying mode, the data transmitting section transmits prescribed data through the transmission interface, and the controller exchanges prescribed information and verifies receiving operation of a device to be verified through the transmission interface. Moreover, the data receiving section receives prescribed data through the reception interface, and the controller exchanges prescribed information and verifies transmitting operation of the device to be verified through the reception interface.

7 Claims, 7 Drawing Sheets

FIG.7

NETWORK DEVICE VERIFYING APPARATUS

RELATED APPLICATIONS

This application is the U.S. National Phase under 35 U.S.C.§371 of International Application No. PCT/JP2006/325086, filed on Dec. 15, 2006, which in turn claims the benefit of Japanese Application No. 2005-361567, filed on Dec. 15, 2005, the disclosures of which Applications are incorporated by reference herein.

TECHNICAL FIELD

The invention generally relates to an apparatus for verifying a network device such as a receiving device and a transmitting device. More particularly, the invention relates to an apparatus for verifying a network device for transmitting prescribed data according to a prescribed standard and prescribed information to be used to process the prescribed data.

BACKGROUND ART

When data communication is conducted, it is necessary to verify that a network device such as a receiving device and a transmitting device operate normally. Conventionally, a verifier conducts such verification by connecting a device to be verified to a verifying apparatus corresponding to the device through the same cable. In the case of a transmitting device, verification is conducted by connecting a transmission terminal of the transmitting device to a reception terminal of a verifying apparatus for the transmitting device on a one-to-one basis. In the case of a receiving device, verification is conducted by connecting a reception terminal of the receiving device to a transmission terminal of a verifying apparatus for the receiving device on a one-to-one basis. In the case of a transmitting and receiving device having both transmission and reception functions, however, a verifying apparatus for a transmitting device and a verifying apparatus for a receiving device cannot be connected to the transmitting and receiving device at the same time to conduct verification. Therefore, the transmission and reception functions of the transmitting and receiving device are separately verified by using separate verifying apparatuses. For example, a verifier first verifies the transmitting function by using a verifying apparatus for a transmitting device and then verifies the receiving function by using a verifying apparatus for a receiving device.

Japanese Laid-Open Patent Publication No. 5-102891 (Patent document 1) discloses a testing system for testing data communication by a self-testing method. A verifying apparatus described therein includes a test data transmitting section for transmitting test data, a test data receiving section for receiving test data, a first signal switching section for folding back a signal, a second signal switching section for supplying and reading test data, a comparing section for comparing a value of transmitted test data with a value of received test data, and an apparatus status control section for controlling each section and having a self fault diagnosis function. When this verifying apparatus is set to a test mode by the apparatus status control section, the first signal switching section switches to a signal fold-back position. The test data transmitting section then transmits a test signal to a circuit to be tested through the second signal switching section. An output signal from the circuit is folded back in the first signal switching section and transmitted back to the circuit. The signal thus transmitted back to the circuit is transmitted to the test data receiving section through the second signal switching section. The test data comparing section compares the test data in the test data transmitting section with the test data in the test data receiving section and determines if data communication is done normally or not.

With recent prevalence of a next-generation multimedia interface, AV (Audio Visual) devices having this interface to transmit information have been developed one after another. In communication using this interface, prescribed data according to a prescribed standard (e.g., an encrypted video signal and an encrypted audio signal) is transmitted together with prescribed information to be used to process the prescribed data (e.g., an encryption key). An example of such an interface is an HDMI (High Definition Multimedia Interface). An HDMI is formed by a high-speed interface (TMDS: Transition Minimized Differential Signaling) and a low-speed interface (DDC: Display Data Channel). Transmission of baseband video and audio data is conducted in the high-speed interface, and transmission and reception of authentication information that is used for authentication between devices, exchange of encryption keys that are required for encryption and decryption of data, and transmission and reception of device information for notifying the other device (a device to which the device is connected) a device status of the device are conducted in the low-speed interface.

Patent document 1: Japanese Laid-Open Patent Publication No. 5-102891
Patent document 2: U.S. Pat. No. 6,940,263
Patent document 3: U.S. Pat. No. 6,385,236
Patent document 4: U.S. Pat. No. 5,953,372

DISCLOSURE OF THE INVENTION

Problems to be Solved by the Invention

However, a verifying apparatus that is adaptable to such a network device for transmitting prescribed data according to a prescribed standard and prescribed information has not been disclosed. Currently, each operation is confirmed by actually connecting a transmitting device and a receiving device to each other. In other words, even when normal operation is verified between a transmitting device and a receiving device, it is not guaranteed that the transmitting device and the receiving device operate normally with other receiving devices and other transmitting devices. Therefore, all the transmitting devices and receiving devices that may be used need to be verified, which is very time-consuming.

It is therefore an object of the invention to provide a verifying apparatus capable of verifying a network device for transmitting prescribed data according to a prescribed standard and prescribed information.

Means for Solving the Problems

According to one aspect of the invention, a network device verifying apparatus has a reception verifying mode for verifying a receiving device, a transmission verifying mode for verifying a transmitting device, and a transmission/reception verifying mode for verifying a transmitting and receiving device. The receiving device receives prescribed data according to a prescribed standard through a reception terminal of the receiving device and exchanges prescribed information according to the prescribed standard which is used to process the prescribed data through the reception terminal. The transmitting device transmits the prescribed data through a transmission terminal of the transmitting device and exchanges the prescribed information through the transmission terminal. The transmitting and receiving device receives the prescribed data and exchanges the prescribed information through a reception terminal of the transmitting and receiving device, and transmits the prescribed data and exchanges the prescribed information through a transmission terminal of the transmitting and receiving device. The network device verifying apparatus includes a transmission interface, a reception interface, a data transmitting section, a data receiving section, and a controller. In the reception verifying mode, the transmission interface is connected to a reception terminal of a device to be verified, the data transmitting section transmits the prescribed data through the transmission interface, and the controller exchanges the prescribed information with the device to be verified and continuously verifies an operation status of the device to be verified through the transmission interface. In the transmission verifying mode, the reception interface is connected to a transmission terminal of a device to be verified, the data receiving section receives the prescribed data through the reception interface, and the controller exchanges the prescribed information with the device to be verified and continuously verifies an operation status of the device to be verified through the reception interface. In the transmission/reception verifying mode, the transmission interface is connected to a reception terminal of a device to be verified, the reception interface is connected to a transmission terminal of the device to be verified, the data transmitting section transmits the prescribed data through the transmission interface, the data receiving section receives the prescribed data through the reception interface, and during data transmission by the data transmitting section, the controller exchanges the prescribed information with the device to be verified and continuously verifies an operation status of the device to be verified through the transmission interface, whereas during data reception by the data receiving section, the controller exchanges the prescribed information with the device to be verified and continuously verifies an operation status of the device to be verified through the reception interface.

The above network device verifying apparatus drives a device to be verified by conducting prescribed data transmission and information transmission, and also obtains information on the operation status of the device to be verified. With this structure, operation of a device to be verified can be verified and the verification time can be reduced.

Preferably, the above network device verifying apparatus further includes a memory for temporarily storing prescribed data to be transmitted by the data transmitting section and temporarily storing prescribed data received by the data receiving section.

In the above network device verifying apparatus, the data transmitting section and the data receiving section share the memory, enabling reduction in circuit size.

According to another aspect of the invention, a network device verifying apparatus has a reception verifying mode for verifying a receiving device and a transmission verifying mode for verifying a transmitting device. The receiving device receives prescribed data according to a prescribed standard through a first reception terminal and exchanges prescribed information according to the prescribed standard which is used to process the prescribed data through a second reception terminal. The transmitting device transmits the prescribed data through a first transmission terminal and exchanges the prescribed information through a second transmission terminal. The network device verifying apparatus includes a transmission interface, a reception interface, a data transmitting section, a data receiving section, and a controller. In the reception verifying mode, the transmission interface is connected to a first reception terminal of a device to be verified, the transmission/reception interface is connected to a second reception terminal of the device to be verified, the data transmitting section transmits the prescribed data through the transmission interface, and the controller exchanges the prescribed information with the device to be verified and continuously verifies an operation status of the device to be verified through the transmission/reception interface. In the transmission verifying mode, the reception interface is connected to a first transmission terminal of a device to be verified, the transmission/reception interface is connected to a second transmission terminal of the device to be verified, the data receiving section receives the prescribed data through the reception interface, and the controller exchanges the prescribed information with the device to be verified and continuously verifies an operation status of the device to be verified through the transmission/reception interface.

The above network device verifying apparatus drives a device to be verified by conducting prescribed data transmission through the transmission interface or the reception interface and conducting prescribed information transmission trough the transmission/reception interface. The above network device verifying apparatus also obtains information on the operation status of the device to be verified through the transmission/reception interface. With this structure, operation of a device to be verified can be verified and the verification time can be reduced.

Effects of the Invention

Operation of a device to be verified can thus be verified, and the time required for verification can be reduced.

DESCRIPTION OF THE REFERENCE NUMERALS (11, 12, 13) network device verifying apparatus
(101S) transmission interface
(101R) reception interface
(201S) transmission-side high-speed interface
(202S) transmission-side low-speed interface
(201R) reception-side high-speed interface
(202R) reception-side low-speed interface
(301) transmission/reception low-speed interface
(102) controller (computer)

(103) transmission/reception function switching section
(104) status notifying section
(105S) transmission-dedicated section
(106S) data transmitting section
(107S) transmission control section
(105R) reception-dedicated section
(106R) data receiving section
(107R) reception control section
(108) memory
(21, 22) device to be verified

BEST MODE FOR CARRYING OUT THE INVENTION

Hereinafter, embodiments of the invention will be described in detail with reference to the accompanying drawings. Note that the same or corresponding portions are denoted by the same reference numerals and characters throughout the figures and description thereof will not be repeated.

(First Embodiment)

Figure 1:
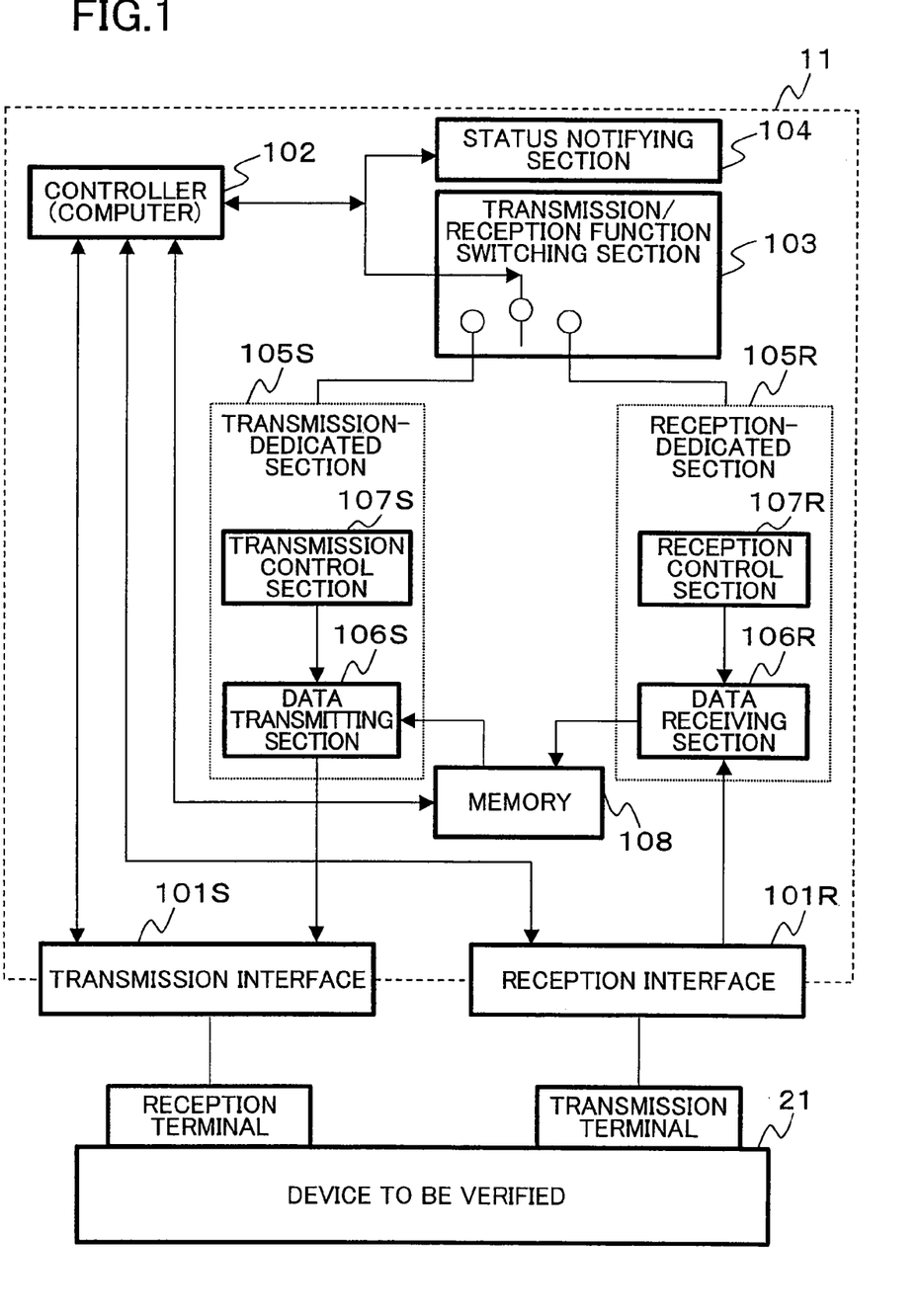
FIG. 1 is a block diagram of a structure of a network device verifying apparatus according to a first embodiment of the invention.

FIG. 1 shows a structure of a network device verifying apparatus according to a first embodiment of the invention. This verifying apparatus 11 verifies operation of a device to be verified, and has a reception verifying mode in which operation of a receiving device is verified, a transmission verifying mode in which operation of a transmitting device is verified, and a transmission/reception verifying mode in which operation of a transmitting and receiving device is verified. In FIG. 1, a transmitting and receiving device is shown as a device to be verified.

[Device to be Verified]

Network devices to be verified by the network device verifying apparatus 11 of this embodiment (a transmitting device, a receiving device, and a transmitting and receiving device) are devices that perform operation according to a prescribed standard (e.g., HDCP (High-bandwidth Digital Content Protection)). These network devices transmit or receive prescribed data according to a prescribed standard such as encrypted data (e.g., an encrypted video signal or an encrypted audio signal). These network devices have prescribed information according to a prescribed standard such as an encryption key (an encryption key that is used to encrypt and decrypt prescribed data) and device information (information of whether the device is a "transmitting device," a "receiving device," or a "transmitting and receiving device"). After performing an authentication process by exchanging encryption keys and device information with the other device (a device to which the network devices are communicating), these network devices transmit or receive prescribed data. After transmitting or receiving the prescribed data, these network devices continuously perform the authentication process at every timing determined by a prescribed standard.

A receiving device receives encrypted data from the other device (a device to which the receiving device is communicating; e.g., a transmitting device) and exchanges encryption keys and device information with the other device through a reception terminal of the receiving device. The receiving device decrypts the encrypted data based on the encryption key of the receiving device, the encryption key of the other device, and the device information of the other device. The receiving device continuously performs an authentication process with the other device at every prescribed timing determined by a prescribed standard.

A transmitting device exchanges encryption keys and device information with the other device (a device to which the transmitting device is communicating) through a transmission terminal of the transmitting device, and produces encrypted data based on the encryption key of the transmitting device, the encryption key of the other device, and the device information of the other device. The transmitting device transmits the encrypted data to the other device (e.g., a receiving device) through the transmission terminal of the transmitting device and continuously performs an authentication process with the other device at every prescribed timing determined by a prescribed standard.

For example, a transmitting and receiving device has its reception terminal connected to a transmitting device and its transmission terminal connected to a receiving device. The transmitting and receiving device receives encrypted data from the other device (a device to which the transmitting and receiving device is communicating; e.g., a transmitting device) and exchanges encryption keys and device information with the transmitting device through the reception terminal of the transmitting and receiving device. The transmitting and receiving device produces prescribed data by decrypting the encrypted data based on the encryption key of the transmitting and receiving device, the encryption key of the transmitting device, and the device information of the transmitting device, and continuously performs an authentication process with the transmitting device at every prescribed timing determined by a prescribed standard. The transmitting and receiving device also exchanges encryption keys and device information with the other device (a device to which the transmitting and receiving device is communicating; e.g., a receiving device) through the transmission terminal of the transmission and receiving device, and produces encrypted data by encrypting the prescribed data again based on the encryption key of the transmitting and receiving device, the encryption key of the receiving device, and the device information of the receiving device. The transmitting and receiving device transmits the encrypted data to the receiving device through the transmission terminal of the transmitting and receiving device and continuously performs an authentication process with the receiving device at every prescribed timing determined by a prescribed standard.

[Structure of the Network Device Verifying Apparatus]

A network device verifying apparatus 11 of this embodiment includes a transmission interface 101S, a reception interface 101R, a controller 102, a transmission/reception function switching section 103, a status notifying section 104, a transmission-dedicated section 105S, a reception-dedicated section 105R, and a memory 108.

The controller 102 performs operation such as verifying mode control, generation and input/output of test data (herein, encrypted data), exchange of prescribed information (herein, encryption keys, device information), transmission and reception of information on an operation status of a device to be verified (operation status information), and verification of operation of a device to be verified. The transmission/reception function switching section 103 controls respective driving states of the transmission-dedicated section 105S and the reception-dedicated section 105R in response to the verifying mode control by the controller 102. The status notifying section 104 notifies the outside whether the verifying mode that is currently designated by the controller 102 is a "reception verifying mode," a "transmission verifying mode," or a "transmission and reception verifying mode." The memory 108 temporarily stores test data.

The transmission-dedicated section 105S includes a data transmitting section 106S and a transmission control section 107S. The data transmitting section 106S transmits test data stored in the memory 108 through the transmission interface 101S. The transmission control section 107S controls transmission of test data by the data transmitting section 106S.

The reception-dedicated section 105R includes a data receiving section 106R and a reception control section 107R. The data receiving section 106R receives test data from the outside through the reception interface 101R and outputs the received test data to the memory 108. The reception control section 107R controls reception of test data by the data receiving section 106R.

[Verification of a Receiving Device]

Figure 2:
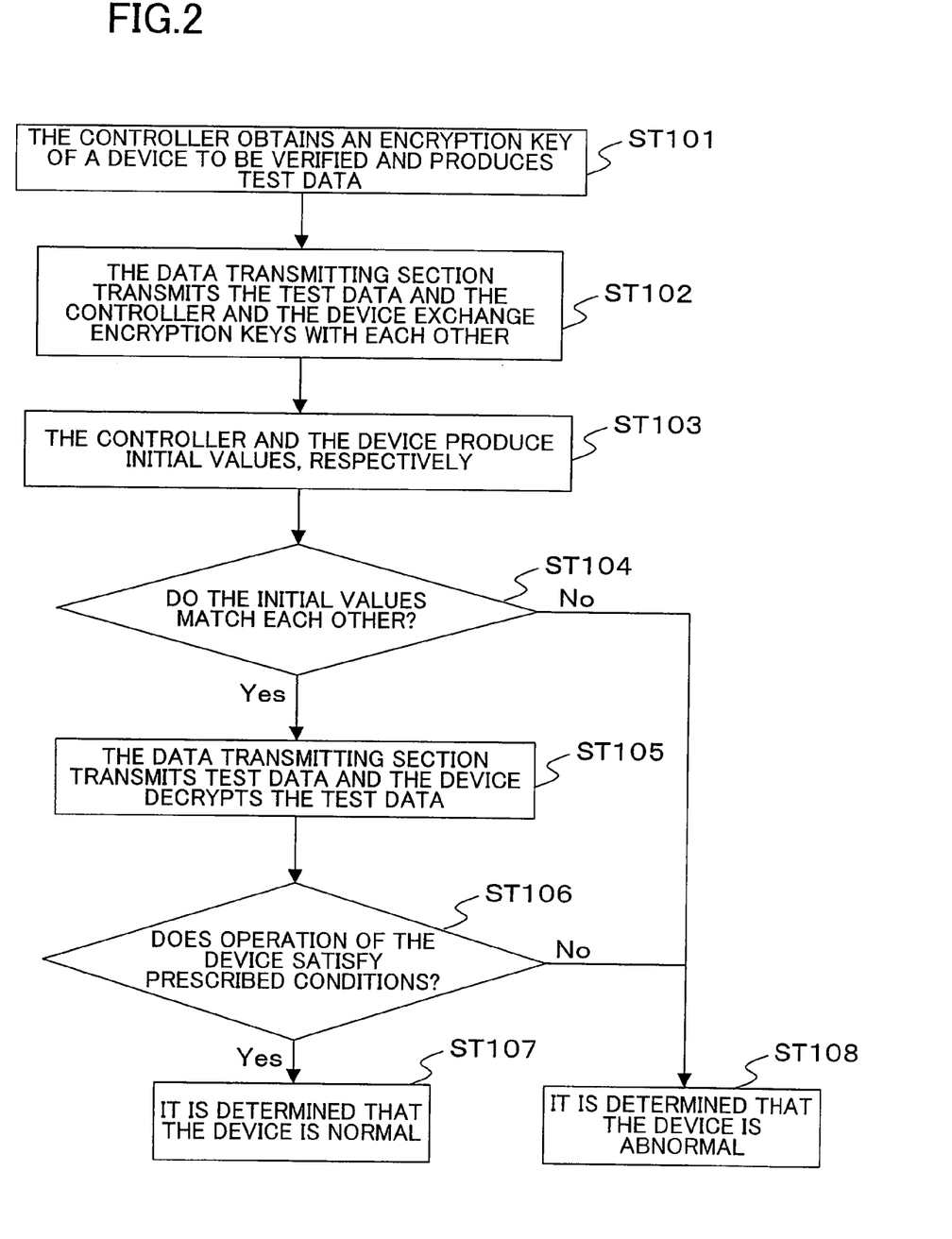
FIG. 2 is a flow chart illustrating a verification process of a transmitting device by the verifying apparatus of FIG. 1.

Hereinafter, operation of the network device verifying apparatus 11 of FIG. 1 in the reception verifying mode will be described with reference to FIG. 2. In the reception verifying mode, the transmission interface 101S is connected to a reception terminal of a device 21 to be verified, which is herein a receiving device, and the reception interface 101R is in a non-connected state. The transmission/reception function switching section 103 drives the transmission-dedicated section 105S and stops the reception-dedicated section 105R in response to a command of the controller 102.

[Step ST101]

First, the device 21 to be verified notifies the controller 102 through the transmission interface 101S that the device 21 is ready for reception. In response to the notification from the device 21, the controller 102 obtains an encryption key of the device 21 and device information of the device 21 through the transmission interface 101S. Based on an encryption key of the controller 102, the encryption key of the device 21, and the device information of the device 21, the controller 102 then generates encryption information that is used to encrypt the prescribed data. For example, the controller 102 performs an arithmetic operation according to a prescribed standard (an arithmetic operation for producing encryption information) by using the encryption key of the controller 102, the encryption key of the device 21, and the device information of the device 21. A value thus calculated is "encryption information." The controller 102 then produces test data by encrypting prescribed data based on the encryption information. The test data thus produced is stored in the memory 108.

[Step ST102]

The data transmitting section 106S then transmits the test data stored in the memory 108 to the device 21 through the transmission interface 101S. The controller 102 exchanges each other's encryption keys and each other's device information with the device 21 through the transmission interface 101S.

[Step ST103]

The controller 102 then produces an initial value according to a prescribed standard, based on the encryption key of the controller 102, the encryption key of the device 21, and the device information of the device 21. For example, the controller 102 performs an arithmetic operation according to a prescribed standard (an arithmetic operation for producing an initial value) by using the encryption key of the controller 102, the encryption key of the device 21, and the device information of the device 21. A value thus calculated is an "initial value." The device 21 also produces an initial value based on the encryption key of the device 21, the encryption key of the controller 102, and the device information of the controller 102.

[Step ST104]

The controller 102 then obtains the initial value produced by the device 21 through the transmission interface 101S and determines if the obtained initial value matches the initial value produced by the controller 102 or not. If the initial value of the device 21 and the initial value of the controller 102 match each other, the process proceeds to Step ST105. Otherwise, the process proceeds to Step ST108.

[Step ST105]

In response to a command from the controller 102, the data transmitting section 106S transmits the test data stored in the memory 108 to the device 21 through the transmission interface 101S. By using the encryption key of the device 21, the encryption key of the controller 102, and the device information of the controller 102, the device 21 produces decryption information that is used to decrypt the test data. The device 21 decrypts the received test data by using the decryption information.

[Step ST106]

The controller 102 obtains information on the operation status of the device 21 through the transmission interface 101S and determines if operation of the device 21 satisfies prescribed conditions or not. The information on the operation status is updated at every prescribed timing, and the controller 102 repeatedly makes the determination about the operation status of the device 21 while the test data is transmitted by the test transmitting section 106S. More specifically, the following processing is performed.

First, in parallel with decryption of the test data, the device 21 repeatedly produces, at every prescribed timing, authentication information that is used to perform an authentication process between the controller 102 and the device 21, based on the encryption key of the device 21, the encryption key of the controller 102, and the device information of the controller 102 (the device 21 updates authentication information of the device 21 at every prescribed timing). For example, the device 21 performs an arithmetic operation according to a prescribed standard (an arithmetic operation for producing authentication information) by using the encryption key of the device 21, the encryption key of the controller 102, and the device information of the controller 102. A value thus calculated is "authentication information."

The controller 102 also updates authentication information of the controller 102 at every prescribed timing based on the encryption key of the controller 102, the encryption key of the device 21, and the device information of the device 21 while the test data is transmitted by the data transmitting section 106S.

The controller 102 repeatedly obtains the authentication information of the device 21 at a prescribed timing through the transmission interface 101S. The controller 102 determines if the authentication information of the device 21 matches the authentication information of the controller 102 or not and if the device 21 has continuously updated the authentication information of the device 21 or not.

The controller 102 thus repeatedly makes the determination about the operation status of the device 21. If operation of the device 21 satisfies the prescribed conditions (if the authentication information of the device 21 has been continuously updated and the authentication information of the device 21 matches the authentication information of the controller 102 each time), the process proceeds to Step ST107. Otherwise, the process proceeds to Step ST108.

[Step ST107]

The controller 102 then determines that the operation of the device 21 is "normal."

[Step ST108]

If the initial value of the controller 102 does not match the initial value of the device 21 in Step ST104 or if the operation of the device 21 does not satisfy the prescribed conditions in Step ST106, the controller 102 determines that the operation of the device 21 is "abnormal."

As has been described above, the controller 102 exchanges information on the operation status with the device 21 bidirectionally through the transmission interface 101S while transmission processing according to a prescribed standard, such as production and transmission of test data and exchange of encryption keys and device information, is conducted. Operation of the device 21 can thus be verified.

[Verification of a Transmitting Device]

Figure 3:
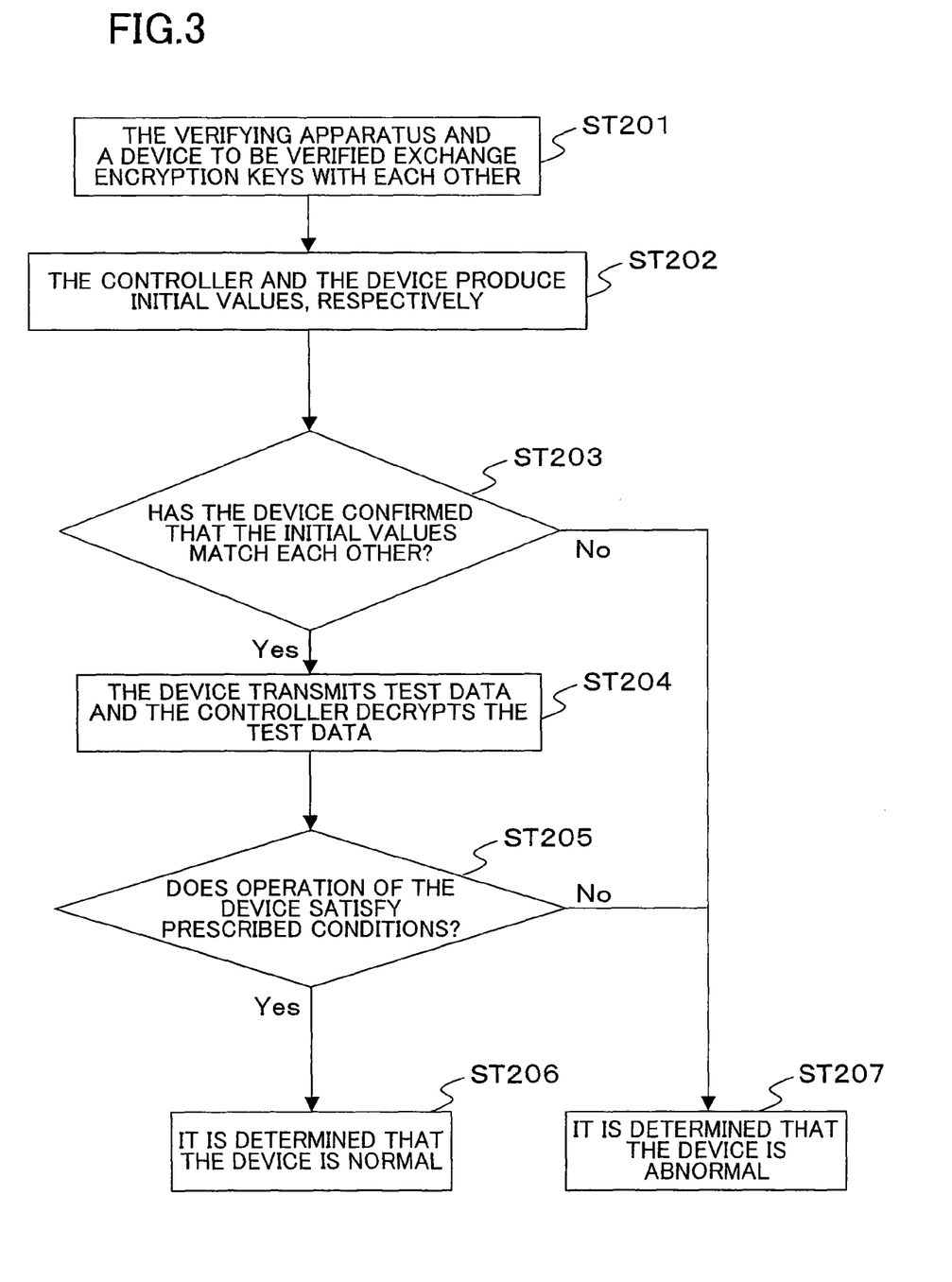
FIG. 3 is a flow chart illustrating a verification process of a receiving device by the verifying apparatus of FIG. 1.

Hereinafter, operation of the network device verifying apparatus 11 of FIG. 1 in a transmission verifying mode will be described with reference to FIG. 3. In the transmission verifying mode, the reception interface 101R is connected to a transmission terminal of a device 21 to be verified, which is herein a transmitting device, and the transmission interface 101S is in a non-connected state. The transmission/reception function switching section 103 stops the transmission-dedicated section 105S and drives the reception-dedicated section 105R.

[Step ST201]

First, the controller 102 notifies the device 21 through the reception interface 101R that the network device verifying apparatus 11 is ready for reception. In response to the notification from the controller 102, the device 21 exchanges encryption keys and device information with the controller 102 through the reception interface 101R.

[Step ST202]

The controller 102 then produces an initial value according to a prescribed standard based on the encryption key of the controller 102, the encryption key of the device 21, and the device information of the device 21. The device 21 also produces an initial value based on the encryption key of the device 21, the encryption key of the controller 102, and the device information of the controller 102.

[Step ST203]

The device 21 then obtains the initial value produced by the controller 102 through the reception interface 101R and confirms if the obtained initial value matches the initial value of the device 21 or not. The controller 102 obtains the confirmation result about the initial values from the device 21 through the reception interface 101R and determines if it has been confirmed in the device 21 that the initial values of the controller 102 and the device 21 match each other or not. If it has been confirmed in the device 21 that the initial values match each other, the process proceeds to Step ST204. If it is not confirmed in the device 21 that the initial values match each other, the process proceeds to Step ST207.

[Step ST204]

If the device 21 has confirmed that the initial values of the device 21 and the controller 102 match each other, the device 21 transmits test data to the data receiving section 106R through the reception interface 101R. The test data received by the data receiving section 106R is stored in the memory 108. Based on the encryption key of the controller 102, the encryption key of the device 21, and the device information of the device 21, the controller 102 produces decryption information that is used to decrypt the test data. For example, the controller 102 performs an arithmetic operation according to a prescribed standard (an arithmetic operation for producing decryption information) by using the encryption key of the controller 102, the encryption key of the device 21, and the device information of the device 21. A value thus calculated is "decryption information." The controller 102 then decrypts the test data stored in the memory 108 based on the decryption information.

[Step ST205]

The controller 102 obtains information on the operation status of the device 21 through the reception interface 101R and determines if operation of the device 21 satisfies prescribed conditions or not. The information on the operation status is updated at every prescribed timing, and the controller 102 repeatedly verifies the operation of the device 21 while the test data is transmitted by the test transmitting section 106S. More specifically, the following processing is performed.

First, in parallel with decryption of the test data, the controller 102 updates authentication information of the controller 102 at every prescribed timing based on the encryption key of the controller 102, the encryption key of the device 21, and the device information of the device 21.

The device 21 also updates authentication information of the device 21 at every prescribed timing based on the encryption key of the device 21, the encryption key of the controller 102, and the device information of the controller 102 while the test data is transmitted.

The device 21 repeatedly obtains the authentication information of the controller 102 at a prescribed timing through the reception interface 101R. Each time, the device 21 confirms if the authentication information of the device 21 and the authentication information of the controller 102 match each other or not.

The controller 102 repeatedly obtains the confirmation result about the authentication information from the device 21 at a prescribed timing through the reception interface 101R. The controller 102 determines if it has been confirmed in the device 21 that the authentication information of the device 21 and the authentication information of the controller 102 match each other or not. The controller 102 also determines if the device 21 has continuously conducted confirmation of the authentication information or not.

The controller 102 thus repeatedly makes the determination about the operation status of the device 21. If operation of the device 21 satisfies prescribed conditions (if the device 21 has continuously conducted confirmation of the authentication information and if it has been confirmed that the authentication information of the device 21 and the authentication information of the controller 102 match each other), the process proceeds to Step ST206. Otherwise, the process proceeds to Step ST207.

[Step ST206]

The controller 102 then determines that the operation of the device 21 is "normal."

[Step ST207]

If it is not confirmed that the initial values of the controller 102 and the device 21 match each other in Step ST203 or if the operation of the device 21 does not satisfy the prescribed conditions in Step ST205, the controller 102 determines that the operation of the device 21 is "abnormal."

As has been described above, the controller 102 exchanges information on the operation status with the device 21 bidirectionally through the reception interface 101R while transmission processing according to a prescribed standard, such as reception of test data and exchange of encryption keys and device information, is conducted. Operation of the device 21 can thus be verified.

[Verification of a Transmitting and Receiving Device]

Figure 4:
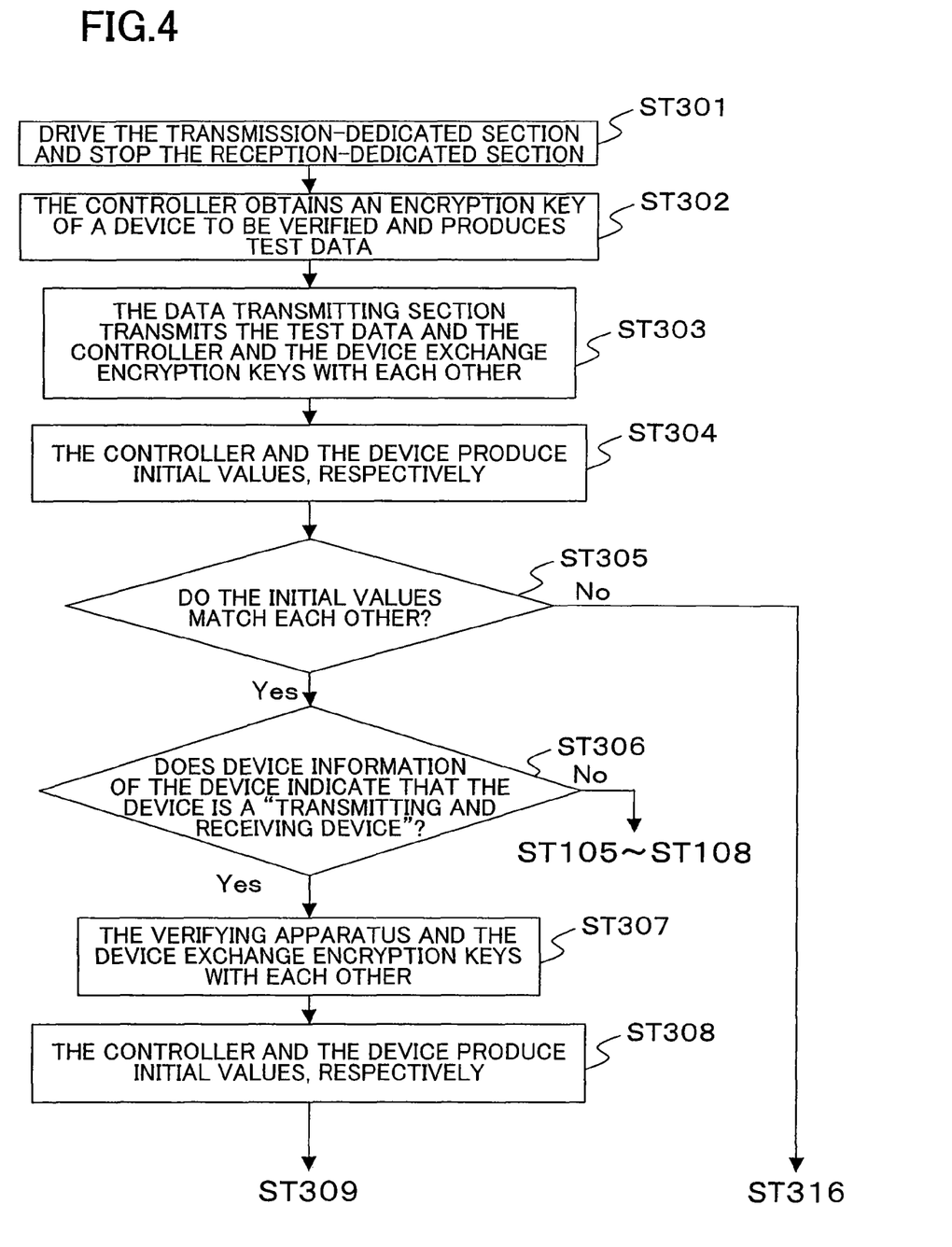
FIG. 4 is a flow chart illustrating a verification process of a transmitting and receiving device by the verifying apparatus of FIG. 1.
Figure 5:
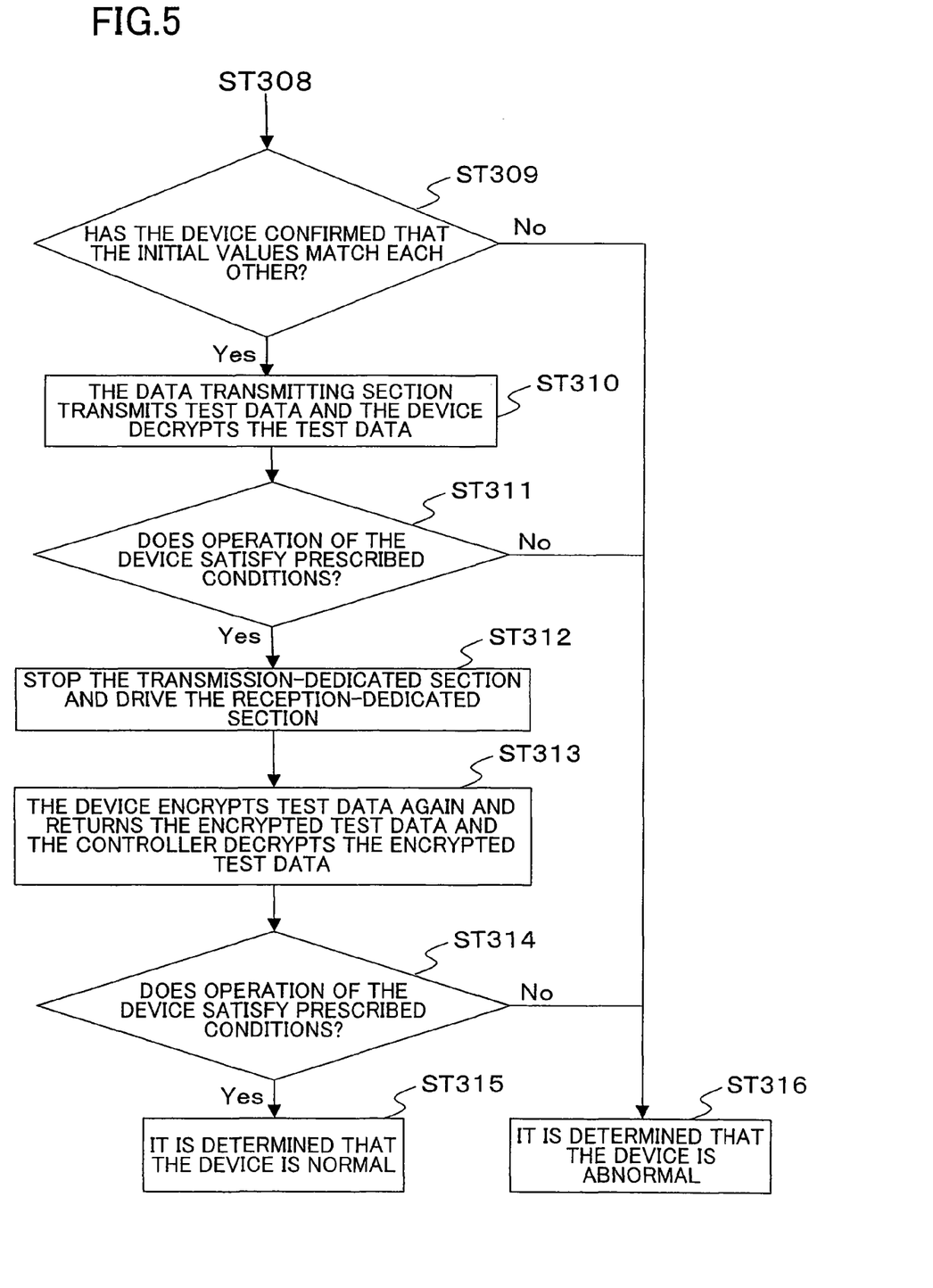
FIG. 5 is a flow chart illustrating a verification process of a transmitting and receiving device by the verifying apparatus of FIG. 1.

Hereinafter, operation of the network device verifying apparatus of FIG. 1 in the transmission/reception verifying mode will be described with reference to FIGS. 4 and 5. In the transmission/reception verifying mode, the transmission interface 101S is connected to a reception terminal of a device 21 to be verified and the reception interface 101R is connected to a transmission terminal of the device 21.

[Step ST301]

First, the transmission/reception function switching section 103 drives the transmission-dedicated section 105S and stops the reception-dedicated section 105R in response to a command from the controller 102.

[Steps ST302 through ST305]

As in Steps ST101 through ST104, after exchange of encryption keys and device information through the transmission interface 101S (ST302) and generation of test data by the controller 102 (ST303), the controller 102 and the device 21 both produce an initial value according to a prescribed standard (ST304) and the controller 102 determines if the initial values of the device 21 and the controller 102 match each other or not (ST305). If the initial values of the device 21 and the controller 102 match each other, the process proceeds to Step ST306. Otherwise, the process proceeds to Step ST316.

[Step ST306]

The controller 102 then confirms the content of the device information of the device 21. If the device information of the device 21 indicates that the device 21 is a "transmitting and receiving device," the process proceeds to Step ST307. If the device information of the device 21 indicates that the device 21 is a "receiving device," the processing in Steps 105 through ST108 is conducted.

[Steps ST307 through ST309]

As in Steps ST201 through ST203, after exchange of encryption keys and device information through the reception interface 101R (ST307), the controller 102 and the device 21 both produce an initial value according to a prescribed standard (ST308) and the controller 102 determines if it has been confirmed in the device 21 that the initial values of the device 21 and the controller 102 match each other or not (ST309). If it has been confirmed in the device 21 that the initial values match each other, the process proceeds to Step ST310. If it is not confirmed in the device 21 that the initial values match each other, the process proceeds to Step ST316.

[Steps ST310 and ST311]

As in Steps ST105 and ST106, in parallel with transmission of test data by the data transmitting section 106S and decryption of the test data by the device 21 (ST310), the controller 102 obtains information on the operation status of the device 21 through the transmission interface 101S and determines if operation of the device 21 satisfies prescribed conditions or not (ST311). If operation of the device 21 satisfies the prescribed conditions, the process proceeds to Step ST312. Otherwise, the process proceeds to Step ST316.

[Step ST312]

The transmission/reception switching section 103 then stops the transmission-dedicated section 105S and drives the reception dedicated section 105R in response to a command from the controller 102.

[Step ST313]

The device 21 produces encryption information based on the encryption key of the device 21, the encryption key of the controller 102, and the device information of the controller 102, and encrypts again the test data decrypted in Step ST310 by using the encryption information. The device 21 transmits the test data thus encrypted to the data receiving section 106R through the reception interface 101R. The test data received by the data receiving section 106R is stored in the memory 108. Based on the encryption key of the controller 102, the encryption key of the device 21, and the device information of the device 21, the controller 102 produces decryption information that is used to decrypt the test data. The controller 102 then decrypts the test data stored in the memory 108 by using the decryption information.

[Step ST314]

As in Step ST205, the controller 102 obtains information on the operation status of the device 21 through the reception interface 101R and determines if operation of the device 21 satisfies prescribed conditions or not. If operation of the device 21 satisfies the prescribed conditions, the process proceeds to Step ST315. Otherwise, the process proceeds to Step ST316.

[Step ST315]

The controller 102 then determines that the operation of the device 21 is "normal."

[Step ST316]

If the initial values of the controller 102 and the device 21 do not match each other in Step ST305, if it is not confirmed that the initial values of the controller 102 and the device 21 match each other in Step ST309, or if the operation of the device 21 does not satisfy the prescribed conditions in Steps ST311 and ST314, the controller 102 determines that the operation of the device 21 is "abnormal."

As has been described above, the controller 102 exchanges information on the operation status with the device 21 bidirectionally through the transmission interface 101S while transmission processing according to a prescribed standard, such as production and transmission of test data and exchange of encryption keys and device information, is conducted. Operation of the device 21 (operation as a receiving device) can thus be verified.

Moreover, the controller 102 exchanges information on the operation status with the device 21 bidirectionally through the reception interface 101R while transmission processing according to a prescribed standard, such as reception of test data and exchange of encryption keys and device information, is conducted. Operation of the device 21 (operation as a transmitting device) can thus be verified.

[Effects]

As has been described above, the network device verifying apparatus of this embodiment drives a device to be verified by conducting data transmission and information transmission according to a prescribed standard, and also exchanges information on the operation status of the device to be verified. With this structure, operation of a network device can be verified, and the verification time can be reduced.

Since information on the operation status is exchanged bidirectionally by using an existing receiving terminal or transmitting terminal of a network device to be verified. Therefore, verification of a network device can be implemented without forming a separate communication path for verifying operation and without modifying a network device.

Moreover, by conducting verification by the controller that is a computer, the verification time can further be reduced.

For verification of a transmitting and receiving device, it is not necessary to separately provide a dedicated verifying apparatus for a transmitting device and a dedicated verifying apparatus for a receiving device. Verification of the transmitting and receiving device can be conducted by connecting the reception interface and the transmission interface of the verifying apparatus to a transmission terminal and a reception terminal of the transmitting and receiving device, respectively. Therefore, the verifying apparatus of this embodiment is very useful. Moreover, since the transmission-dedicated section 105S and the reception-dedicated section 105R share the memory 108 for storing test data, circuit size can be reduced as compared to the case where a verifying apparatus for a transmitting device and a verifying apparatus for a receiving device are provided separately.

(Second Embodiment)

A network device according to HDMI (High Definition Multimedia Interface) includes two kinds of interfaces: a high-speed interface for unidirectional data transmission and a low-speed interface for bidirectional data transmission. A data transmission rate in the high-speed interface is higher than that in the low-speed interface.

[Device to be Verified]

A reception terminal of a receiving device according to HDMI is formed by a high-speed reception terminal and a low-speed reception terminal. A transmission terminal of a transmitting device according to HDMI is formed by a high-speed transmission terminal and a low-speed transmission terminal. A reception terminal of a transmitting and receiving device according to HDMI is formed by a high-speed reception terminal and a low-speed reception terminal, and a transmission terminal of the transmitting and receiving device is formed by a high-speed transmission terminal and a low-speed transmission terminal.

In general, a network device according to HDMI performs operation according to HDCP. Prescribed data such as encrypted data is transmitted through a high-speed terminal (a high-speed reception terminal, a high-speed transmission terminal), and prescribed information such as an encryption key is transmitted bidirectionally through a low-speed terminal (a low-speed reception terminal, a low-speed transmission terminal).

[Structure]

Figure 6:
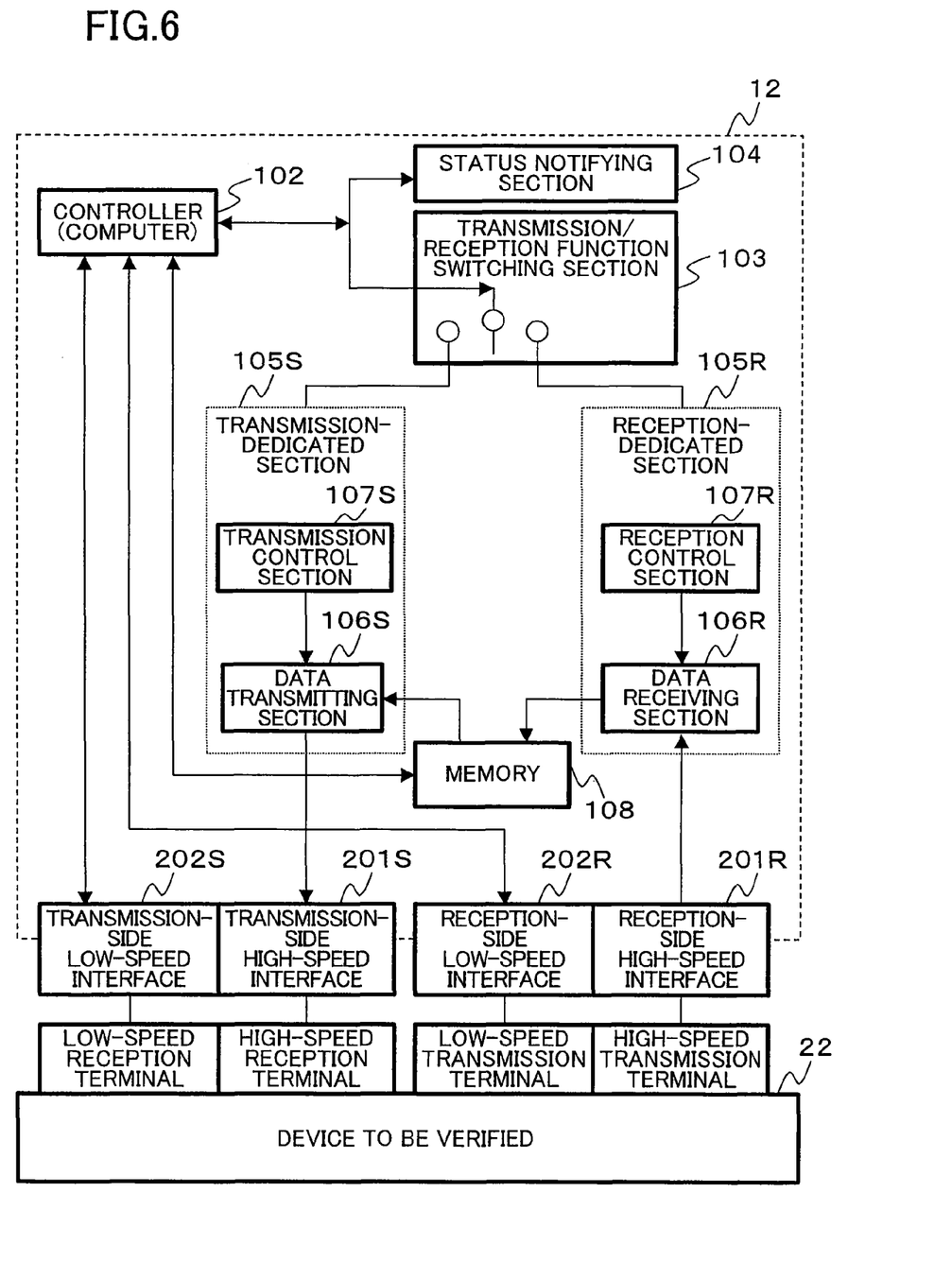
FIG. 6 is a block diagram of a structure of a network device verifying apparatus according to a second embodiment of the invention.

FIG. 6 shows a structure of a network device verifying apparatus according to a second embodiment of the invention. This verifying apparatus 12 verifies operation of a network device according to HDMI (a device 22 to be verified). The network device verifying apparatus 12 includes a transmission-side high-speed interface 201S, a transmission-side low-speed interface 202S, a reception-side high-speed interface 201R, and a reception-side low-speed interface 202R instead of the transmission interface 101S and the reception interface 101R in FIG. 1.

A data transmission rate in the transmission-side high-speed interface 201S is higher than that in the transmission-side low-speed interface 202S. A data transmission rate in the reception-side high-speed interface 201R is higher than that in the reception-side low-speed interface 202R.

Transmission and reception of test data are conducted through the high-speed interfaces 201S and 201R. Exchange of encryption keys, device information, information on the operation status (an initial value, a confirmation result about the initial value, authentication information, and a confirmation result about the authentication information), and the like are conducted through the low-speed interfaces 202S and 202R. The structure is otherwise the same as that shown in FIG. 1.

[Operation]

The network device verifying apparatus 12 of FIG. 6 conducts verification of a receiving device, verification of a transmitting device, and verification of a transmitting and receiving device in the same manner as that shown in FIGS. 2, 3, 4, and 5. However, connection of each interface, a transmission path of test data, and a transmission path of test information are different from those of the network device verifying device 11 of FIG. 1.

[Verification of a Receiving Device]

Each interface is connected as follows:

Transmission-side high-speed interface 201S: a high-speed reception terminal of a device 22 to be verified;

Transmission-side low-speed interface 202S: a low-speed reception terminal of the device 22;

Reception-side high-speed interface 201R: non-connected; and

Reception-side low-speed interface 202R: non-connected.

The data transmitting section 106S transmits test data through the transmission-side high-speed interface 201S. The controller 102 exchanges encryption keys, device information, and information on the operation status with the device 22 through the transmission-side low-speed interface 202S.

[Verification of a Transmitting Device]

Each interface is connected as follows:

Transmission-side high-speed interface 201S: non-connected;

Transmission-side low-speed interface 202S: non-connected;

Reception-side high-speed interface 201R: a high-speed transmission terminal of a device 22 to be verified; and Reception-side low-speed interface 202R: a low-speed transmission terminal of the device 22.

The data receiving section 106R receives test data through the reception-side high-speed interface 201R. The controller 102 exchanges encryption keys, device information, and information on the operation status with the device 22 through the reception-side low-speed interface 202R.

[Verification of a Transmitting and Receiving Device]

Each interface is connected as follows:

Transmission-side high-speed interface 201S: a high-speed reception terminal of a device 22 to be verified;

Transmission-side low-speed interface 202S: a low-speed reception terminal of the device 22;

Reception-side high-speed interface 201R: a high-speed transmission terminal of the device 22; and Reception-side low-speed interface 202R: a low-speed transmission terminal of the device 22.

The data transmitting section 106S transmits test data through the transmission-side high-speed interface 201S. The controller 102 exchanges encryption keys, device information, and information on the operation status with the device 22 through the transmission-side low-speed interface 202S. The data receiving section 106R receives test data through the reception-side high-speed interface 201R. The controller 102 exchanges encryption keys, device information, information on the operation status with the device 22 through the reception-side low-speed interface 202R.

[Effects]

As has been described above, the network device verifying apparatus of this embodiment drives a device to be verified by conducting prescribed data transmission through a high-speed interface and conducting prescribed information transmission trough a low-speed interface. The network device verifying apparatus of this embodiment also exchanges information on the operation status of the device to be verified through a low-speed interface. With this structure, operation of a network device according to HDMI can be verified and the verification time can be reduced.

(Third Embodiment)

[Structure]

Figure 7:
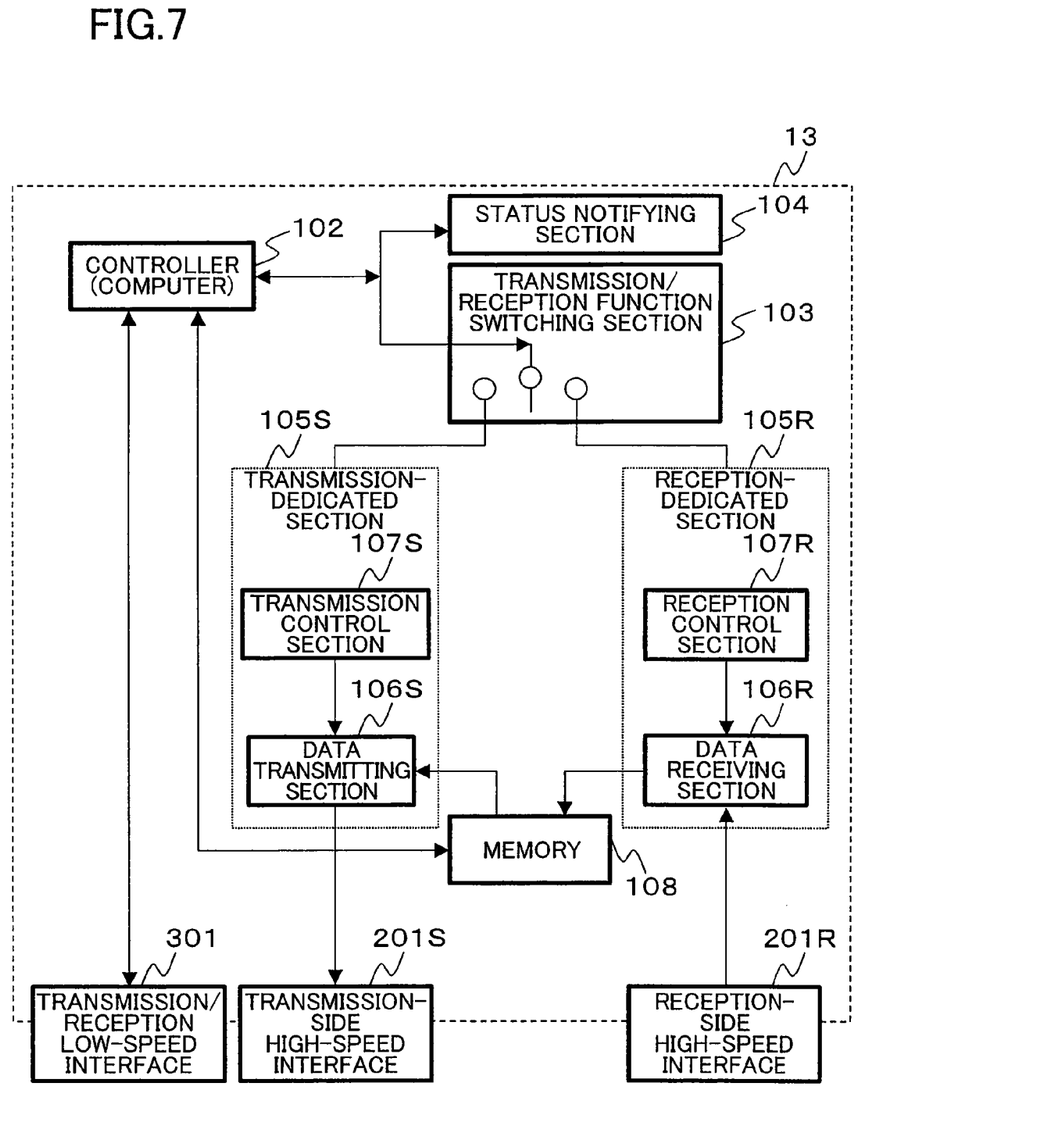
FIG. 7 is a block diagram of a structure of a network device verifying apparatus according to a third embodiment of the invention.

FIG. 7 shows a structure of a network device verifying apparatus according to a third embodiment of the invention. This verifying apparatus 13 includes a transmission/reception low-speed interface 301 instead of the transmission-side low-speed interface 202S and the reception-side low-speed interface 202R shown in FIG. 6. The structure is otherwise the same as that shown in FIG. 6.

[Operation]

The network device verifying apparatus 13 of FIG. 7 conducts verification of a receiving device and verification of a transmitting device. Verification of a receiving device and verification of a transmitting device by this verifying apparatus 13 are conducted in the same manner as that shown in FIGS. 2 and 3. However, connection of each interface, a transmission path of test data, and a transmission path of information that is exchanged bidirectionally (encryption keys, device information, and information on the operation status) are different from those of the network device verifying device 11 of FIG. 1.

[Verification of a Receiving Device]

Each interface is connected as follows:

Transmission-side high-speed interface 201S: a reception-side high-speed interface of a device 22 to be verified;

Transmission/reception low-speed interface 301: a reception-side low-speed interface of the device 22; and Reception-side high-speed interface 201R: non-connected.

The data transmitting section 106S transmits test data through the transmission-side high-speed interface 201S. The controller 102 exchanges encryption keys, device information, and information on the operation status with the device 22 through the transmission/reception low-speed interface 301.

[Verification of a Transmitting Device]

Each interface is connected as follows:

Transmission-side high-speed interface 201S: non-connected;

Transmission/reception low-speed interface 301: a transmission-side low-speed interface of a device 22 to be verified; and Reception-side high-speed interface 201R: a transmission-side high-speed interface of the device 22.

The data receiving section 106R receives test data through the reception-side high-speed interface 201R. The controller 102 exchanges encryption keys, device information, and information on the operation status with the device 22 through the transmission/reception low-speed interface 301.

[Effects]

As has been described above, the network device verifying apparatus of this embodiment drives a device to be verified by conducting prescribed data transmission through a high-speed interface and conducting prescribed information transmission trough a low-speed interface. The network device verifying apparatus of this embodiment also exchanges information on the operation status of the device to be verified through a low-speed interface. With this structure, operation of a network device according to HDMI can be verified and the verification time can be reduced.

Industrial Applicability

As has been described above, the invention is useful as, e.g., a verifying apparatus for a network device (especially, a network device according to HDMI) for transmitting prescribed data and prescribed information that is used to process the prescribed data.

The invention claimed is:

1. A network device verifying apparatus having a reception verifying mode for verifying a receiving device, a transmission verifying mode for verifying a transmitting device, and a transmission/reception verifying mode for verifying a transmitting and receiving device, wherein the receiving device receives prescribed data according to a prescribed standard through a reception terminal of the receiving device and exchanges prescribed information according to the prescribed standard which is used to process the prescribed data through the reception terminal, the transmitting device transmits the prescribed data through a transmission terminal of the transmitting device and exchanges the prescribed information through the transmission terminal, and the transmitting and receiving device receives the prescribed data and exchanges the prescribed information through a reception terminal of the transmitting and receiving device and transmits the prescribed data and exchanges the prescribed information through a transmission terminal of the transmitting and receiving device, the network device verifying apparatus comprising a transmission interface, a reception interface, a data transmitting section, a data receiving section, and a controller, wherein in the reception verifying mode, the transmission interface connected to a reception terminal of a device to be verified, the data transmitting section transmits the prescribed data through the transmission interface, and the controller exchanges the prescribed information with the device to be verified and continuously verifies an operation status of the device to be verified through the transmission interface, in the transmission verifying mode, the reception interface is connected to a transmission terminal of a device to be verified, the data receiving section receives the prescribed data through the reception interface, and the controller exchanges the prescribed information with the device to be verified and continuously verifies an operation status of the device to be verified through the reception interface, and in the transmission/reception verifying mode, the transmission interface is connected to a reception terminal of a device to be verified, the reception interface is connected to a transmission terminal of the device to be verified, the data transmitting section transmits the prescribed data through the transmission interface, the data receiving section receives the prescribed data through the reception interface, and during data transmission by the data transmitting section, the controller exchanges the prescribed information with the device to be verified and continuously verifies an operation status of the device to be verified through the transmission interface, whereas during data reception by the data receiving section, the controller exchanges the prescribed information with the device to be verified and continuously verifies an operation status of the device to be verified through the reception interface, wherein according to the prescribed standard, each of the receiving device, the transmitting device, and the transmitting and receiving device processes the prescribed data by using the prescribed information obtained from a device to which the receiving device, the transmitting device, or the transmitting and receiving device is communicating and prescribed information of the receiving device, the transmitting device, or the transmitting and receiving device itself, updates authentication information that is used for authentication by using the prescribed information, and confirms if authentication information of the receiving device, the transmitting device, or the transmitting and receiving device itself matches authentication information of the device to which the receiving device, the transmitting device, or the transmitting and receiving device is communicating or not, in the reception verifying mode, the controller verifies an operation status of the device to be verified according to the prescribed standard by updating authentication information of the controller based on prescribed information obtained from the device to be verified and prescribed information of the controller, obtaining authentication information of the device to be verified through the transmission interface, and continuously determining if the authentication information of the controller and the authentication information of the device to be verified match each other or not, in the transmission verifying mode, the controller verifies an operation status of the device to be verified according to the prescribed standard by updating authentication information of the controller based on prescribed information obtained from the device to be verified and prescribed information of the controller, obtaining a confirmation result about authentication information of the device to be verified through the reception interface, and continuously determining if the device to be verified has confirmed that the authentication information of the controller and the authentication information of the device to be verified match each other or not, in the transmission/reception verifying mode, the controller verifies receiving operation of the device to be verified according to the prescribed standard by updating authentication information of the controller based on prescribed information obtained from the device to be verified and prescribed information of the controller, obtaining authentication information of the device to be verified through the transmission interface, and continuously determining if the authentication information of the controller and the authentication information of the device to be verified match each other or not, and the controller verifies transmitting operation of the device to be verified according to the prescribed standard by updating authentication information of the controller based on prescribed information obtained from the device to be verified and prescribed information of the controller, obtaining a confirmation result about authentication information of the device to be verified through the reception interface, and continuously determining if the device to be verified has confirmed that the authentication information of the controller and the authentication information of the device to be verified match each other or not and the prescribed data includes encrypted data, and the prescribed information includes an encryption key that is used to encrypt or decrypt the prescribed data, and device information indicating whether the device has a transmitting function, a receiving function, or a transmitting and receiving function.

2. The network device verifying apparatus according to claim 1, wherein the respective transmission terminals of the transmitting device and the transmitting and receiving device are formed by a first transmission terminal for transmitting the prescribed data and a second transmission terminal for exchanging the prescribed information;

the respective reception terminals of the receiving device and the transmitting and receiving device are formed by a first reception terminal for receiving the prescribed data and a second reception terminal for exchanging the prescribed information;

the transmission interface is formed by a first transmission interface corresponding to the first reception terminal and a second transmission interface corresponding to the second reception terminal;

the reception interface is formed by a first reception interface corresponding to the first transmission terminal and a second reception interface corresponding to the second transmission terminal;

the data transmitting section transmits the prescribed data through the first transmission interface, the data receiving section receives the prescribed data through the first reception interface, and the controller exchanges the prescribed information and verifies operation of the device to be verified through the second transmission interface or the second reception interface.

3. The network device verifying apparatus according to claim 2, wherein a communication rate in the first transmission interface is higher than a communication rate in the second transmission interface, and a communication rate in the first reception interface is higher than a communication rate in the second reception interface.

4. The network device verifying apparatus according to claim 1, wherein the prescribed standard is HDCP (High-bandwidth Digital Content Protection).

5. The network device verifying apparatus according to claim 1, further comprising a memory for temporarily storing prescribed data to be transmitted by the data transmitting section and temporarily storing prescribed data received by the data receiving section.

6. The network device verifying apparatus according to claim 1, further comprising a status notifying section for notifying whether a current verifying mode is a reception verifying mode, a transmission verifying mode, or a transmission/reception verifying mode.

7. A network device verifying apparatus having a reception verifying mode for verifying a receiving device and a transmission verifying mode for verifying a transmitting device, wherein the receiving device receives prescribed data according to a prescribed standard through a first reception terminal and exchanges prescribed information according to the prescribed standard which is used to process the prescribed data through a second reception terminal, and the transmitting device transmits the prescribed data through a first transmission terminal and exchanges the prescribed information through a second transmission terminal, the network device verifying apparatus comprising a transmission interface, a reception interface, a transmission/reception interface, a data transmitting section, a data receiving section, and a controller, wherein in the reception verifying mode, the transmission interface is connected to a first reception terminal of a device to be verified, the transmission/reception interface is connected to a second reception terminal of the device to be verified, the data transmitting section transmits the prescribed data through the transmission interface, and the controller exchanges the prescribed information with the device to be verified and continuously verifies an operation status of the device to be verified through the transmission/reception interface, and in the transmission verifying mode, the reception interface is connected to a first transmission terminal of a device to be verified, the transmission/reception interface is connected to a second transmission terminal of the device to be verified, the data receiving section receives the prescribed data through the reception interface, and the controller exchanges the prescribed information with the device to be verified and continuously verifies an operation status of the device to be verified through the transmission/reception interface, wherein according to the prescribed standard, each of the receiving device and the transmitting device processes the prescribed data by using the prescribed information obtained from a device to which the receiving device or the transmitting device is communicating and prescribed information of the receiving device or the transmitting device itself, updates authentication information that is used for authentication by using the prescribed information, and confirms if authentication information of the receiving device or the transmitting device itself matches authentication information of the device to which the receiving device or the transmitting device is communicating or not, in the reception verifying mode, the controller verifies an operation status of the device to be verified according to the prescribed standard by updating authentication information of the controller based on prescribed information obtained from the device to be verified and prescribed information of the controller, obtaining authentication information of the device to be verified through the transmission/reception interface, and continuously determining if the authentication information of the controller and the authentication information of the device to be verified match each other or not, in the transmission verifying mode, the controller verifies an operation status of the device to be verified according to the prescribed standard by updating authentication information of the controller based on prescribed information obtained from the device to be verified and prescribed information of the controller, obtaining a confirmation result about authentication information of the device to be verified through the transmission/reception interface, and continuously determining if the device to be verified has confirmed that the authentication information of the controller and the authentication information of the device to be verified match each other or not, and the prescribed data includes encrypted data, and the prescribed information includes an encryption key that is used to encrypt or decrypt the prescribed data, and device information indicating whether the device has a transmitting function, a receiving function, or a transmitting and receiving function.

\* \* \* \* \*